(12) United States Patent
Awad et al.

(10) Patent No.: US 9,876,724 B2
(45) Date of Patent: Jan. 23, 2018

(54) METHOD FOR SEAMLESS MULTI-LINK NETWORK CONNECTIVITY

(71) Applicant: Jordan University of Science and Technology, Irbid (JO)

(72) Inventors: Fahed Hasan Awad, Irbid (JO); Sarah Hanai Homsi, Irbid (JO); Mhd Adel Ghassan Al Qodmani, Irbid (JO)

(73) Assignee: Jordan University of Science and Technology (JO)

( * ) Notice: Subject to any disclaimer, the term of this patent is extended or adjusted under 35 U.S.C. 154(b) by 382 days.

(21) Appl. No.: 14/581,370

(22) Filed: Dec. 23, 2014

(65) Prior Publication Data

US 2016/0182386 A1   Jun. 23, 2016

(51) Int. Cl.
*H04L 12/857* (2013.01)
*H04L 12/64* (2006.01)
*H04L 12/891* (2013.01)

(52) U.S. Cl.
CPC ...... *H04L 47/2491* (2013.01); *H04L 12/6418* (2013.01); *H04L 47/41* (2013.01)

(58) Field of Classification Search
None
See application file for complete search history.

(56) References Cited

U.S. PATENT DOCUMENTS

| | | | | |
|---|---|---|---|---|
| 6,650,621 B1 * | 11/2003 | Maki-Kullas | ........... | H04L 45/00 370/238 |
| 7,583,677 B1 * | 9/2009 | Ma | ........... | H04L 45/00 370/235 |
| 2002/0009072 A1 * | 1/2002 | Halme | ........... | H04L 45/04 370/352 |
| 2004/0037297 A1 * | 2/2004 | Ishida | ........... | H04L 29/06 370/395.54 |
| 2005/0055435 A1 * | 3/2005 | Gbadegesin | ........... | H04L 29/06 709/224 |
| 2009/0003271 A1 * | 1/2009 | Khawer | ........... | H04L 45/24 370/329 |

* cited by examiner

*Primary Examiner* — Andrew Lai
*Assistant Examiner* — Jamaal Henson
(74) *Attorney, Agent, or Firm* — Kelly Kordzik; Matherson Keys Daffer & Kordzik PLLC

(57) ABSTRACT

The present invention provides a method for seamless multi-link network connectivity, wherein such method utilizes a plurality of connections at the same time by providing an application-sensitive seamless connectivity between two end systems via several links so that the data are seamlessly transmitted among these links. In the method of the present invention when one link fails, the traffic is automatically transmitted via the available links of said plurality of connections and when it comes back up, it is automatically used again. In the method of the present invention when more than one link is active and the Quality of Service needs of an application can't be met by using a single link, more than one link is used through load-balancing mechanism. Said method provides the best possible service for each type of application based on its own Quality of Service requirements.

20 Claims, 4 Drawing Sheets

METHOD FOR SEAMLESS MULTI-LINK NETWORK CONNECTIVITY

FIELD OF THE INVENTION

The present invention relates to a method for seamless multi-link network connectivity, and more particularly utilizing a plurality of connections at the same time by providing application-sensitive seamless connectivity between two end systems via several links so that the data are seamlessly transmitted among these links.

BACKGROUND OF THE INVENTION

Most recent personal computing devices, such as smartphones and tablets are usually equipped with more than one type of interface for network connectivity. Yet, current protocols in the TCP/IP stack do not allow end systems to utilize more than one connection simultaneously at the Network layer as if they are a single connection. There exists however protocols in other layers that allow such a thing to happen and other conventional solutions that relate to methods for seamless-transparent connectivity.

Most notably among previously mentioned protocols is the Stream Control Transmission Protocol which is a transport layer protocol that has native support for multi-homing. While it provides the ability to seamlessly fail-over from a link to another, it falls short of utilizing more than one active link at the same time to do network load-balancing; it also forces the user to use this particular transport layer protocol, as opposed to the more common UDP or TCP.

Among said conventional solutions, there is provided a gateway which provides network connectivity via network service providers. A method and apparatus can integrate the various connectivity options provided by multiple service providers and present to the user a single point of connectivity. Having more than one way of network connectivity may provide the following additional services: Link Aggregation (to increase bandwidth), Redundancy and ancillary services like TOD (time-of-day) based smart usage (to reduce costs). The access medium may be wired technologies like Cable, DSL, Fiber to wireless 4G technologies. These options may offer various link speeds, latency, reliability and cost structures. The embodiments integrate the various connectivity options provided by multiple service providers and present to the user a single point of connectivity.

Another conventional solution discloses a 4G multilink balance and data link intelligent selection communication system, belonging to the technical field of communication management. According to the technical scheme provided by the invention, the 4G multilink balance and data link intelligent selection communication system comprises an intelligent communication gateway. The intelligent communication gateway is connected with the internet through a connecting network, wherein the connecting network at least comprises two types of communication link networks. The intelligent communication gateway can exchange data with the internet by using the communication link networks in the connecting network at the same time. The user equipment exchange data with the internet through the intelligent communication gateway, and the intelligent communication gateway is connected with the internet through the connecting network and can exchange data with the internet by using two or more communication link networks in the connecting network at the same time, so that the utilization rate of the bandwidth is improved. The intelligent communication gateway sets the data transmitting priority and the communication link networks of the data stream so as to guarantee the data exchange quality and reliability.

None of the above conventional solutions disclosed a method for seamless multi-link network connectivity at the Network layer, and more particularly utilizing a plurality of connections at the same time by providing application-sensitive seamless connectivity between two end systems via several links so that the data are seamlessly transmitted among these links.

SUMMARY OF THE INVENTION

It is therefore an object of the preset invention to provide a method for seamless multi-link network connectivity.

It is an aspect of the present invention to have a method for seamless multi-link network connectivity, and more particularly utilizing a plurality of connections at the same time by providing application-sensitive seamless connectivity between two end systems via several links so that the data are seamlessly transmitted among these links.

It is an aspect of the present invention to seamlessly transmit data among several links providing the best mixture of bandwidth, availability and best possible service for each type of application based on its Quality of Service requirements.

It is an aspect of the present invention to take the Quality of Service into consideration, wherein said Quality of Service affects network traffic and the quality of an application's performance.

The end system in which the method of the present invention will be implemented has a plurality of active links, wherein each active link has a different IP address.

Said end system has a default link with a default IP address chosen by the application of data transfer or the operating system of the end system, wherein said default IP address is the IP address that is used to establish the connection between two end systems.

It is an aspect of the present invention to perform an IP address translation and association within the IP layer.

It is an aspect of the present invention to use a seamless transparent connectivity module within the IP layer at both sides of the connection.

In the method of the present invention, the seamless transparent connectivity module at one side of the connection captures the packets as they come out of the IP layer, changes the source IP address to one of said active IP addresses, wherein such active IP addresses include the default IP address, and changes the destination IP address to be one of the IP addresses of the other end of the connection.

In the method of the present invention, the seamless transparent connectivity module at the other side captures the received packets as they enter the IP layer and changes the source IP address and the destination IP address with the default IP addresses of the end systems.

BRIEF DESCRIPTION OF THE DRAWINGS

The invention will now be described with reference to the accompanying drawings, which illustrate a preferred embodiment of the present invention without restricting the scope of the invention's concept, and in which.

DETAILED DESCRIPTION OF THE PREFERRED EMBODIMENT

Figure 1A:
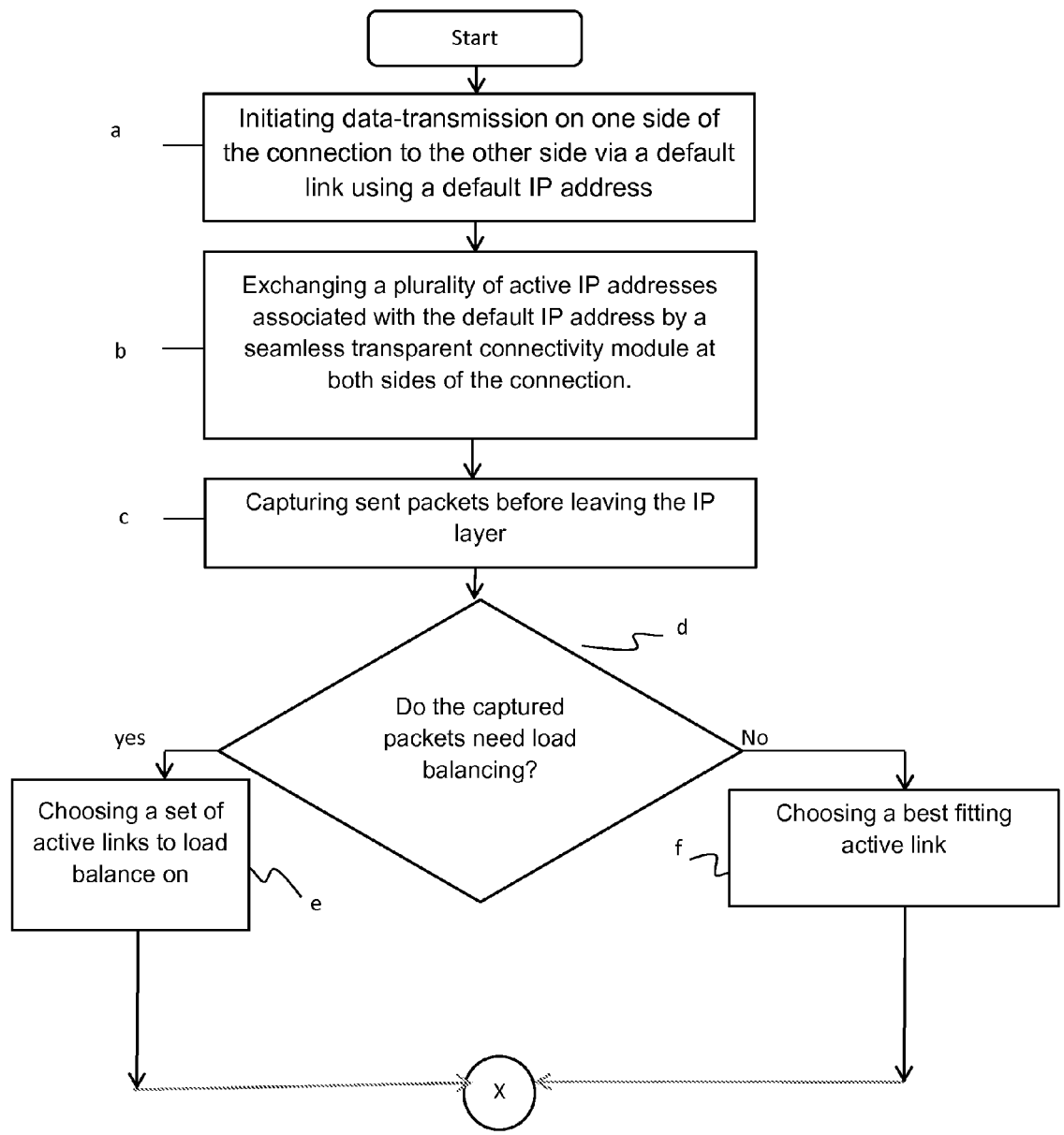
FIGS. 1A and 1B illustrate a flow chart showing the steps of a method for seamless multi-link connectivity configured according to a preferred embodiment of the present invention.
Figure 1B:
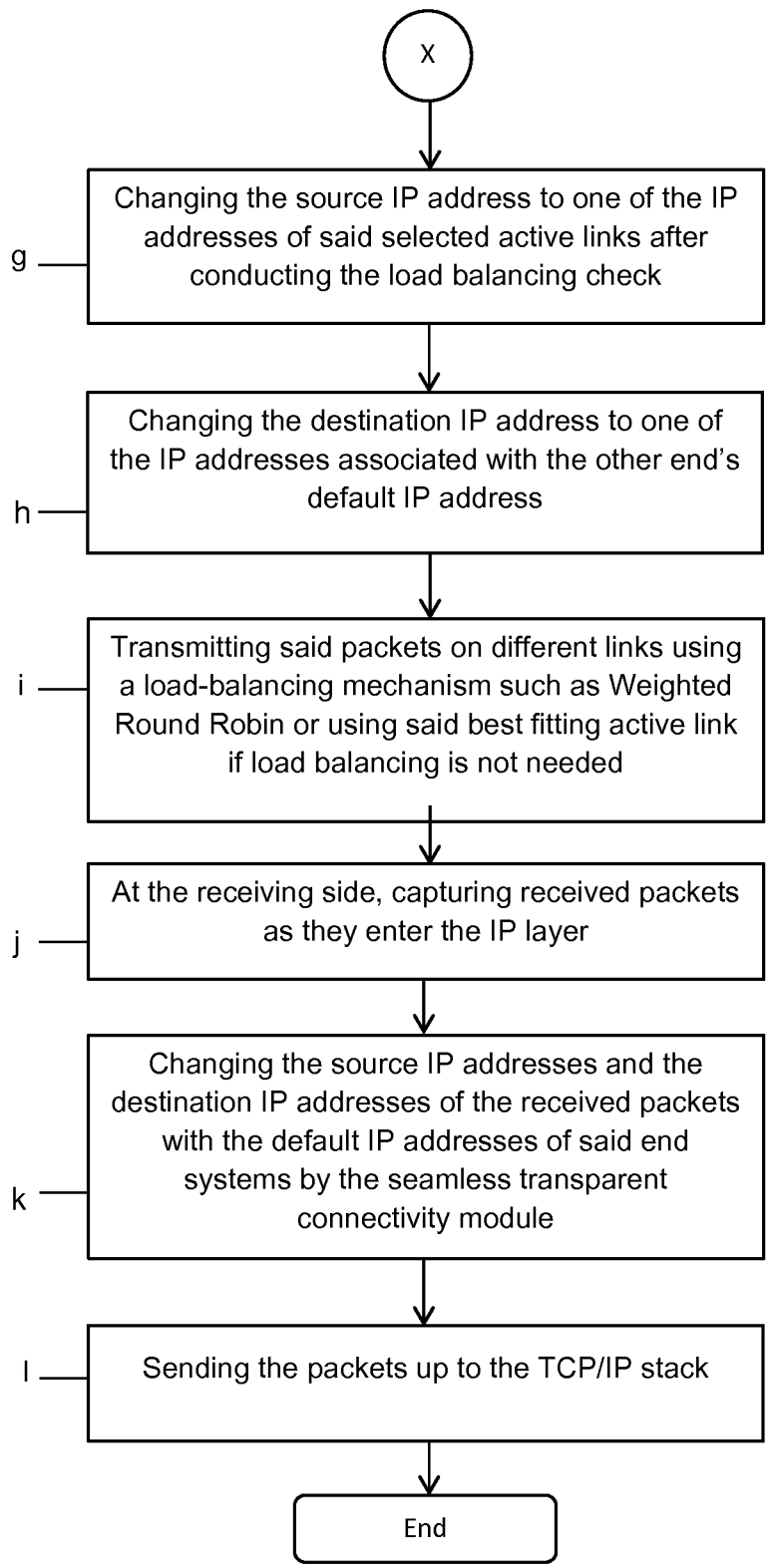

FIGS. 1A and 1B illustrate a flow chart showing the steps of a method for seamless multi-link connectivity configured according to a preferred embodiment of the present invention, wherein such method uses a seamless transparent connectivity to establish a connection between two end systems. The method of the present invention comprises the steps of:

a—Initiating data-transmission on one side of the connection to the other side via a default link using a default IP address;

b—Exchanging a plurality of active IP addresses associated with the default IP address by a seamless transparent connectivity module at both sides of the connection;

c—Capturing sent packets before leaving the IP layer;

d—Checking whether the captured packets need load balancing;

e—If load balancing is needed, then a set of active links is chosen to load balance on;

f—If load balancing is not needed, then a best fitting active link is chosen;

g—Changing the source IP address to one of the IP addresses of said selected active links after conducting the load balancing check;

h—Changing the destination IP address to one of the IP addresses associated with the other end's default IP address;

i—Transmitting said packets on different links using a load-balancing mechanism such as Weighted Round Robin or using said best fitting active link if load balancing is not needed;

j—At the receiving side, capturing received packets as they enter the IP layer;

k—Changing the source IP addresses and the destination IP addresses of the received packets with the default IP addresses of said end systems by the seamless transparent connectivity module;

l—Letting the packets up the TCP/IP stack.

Figure 2:
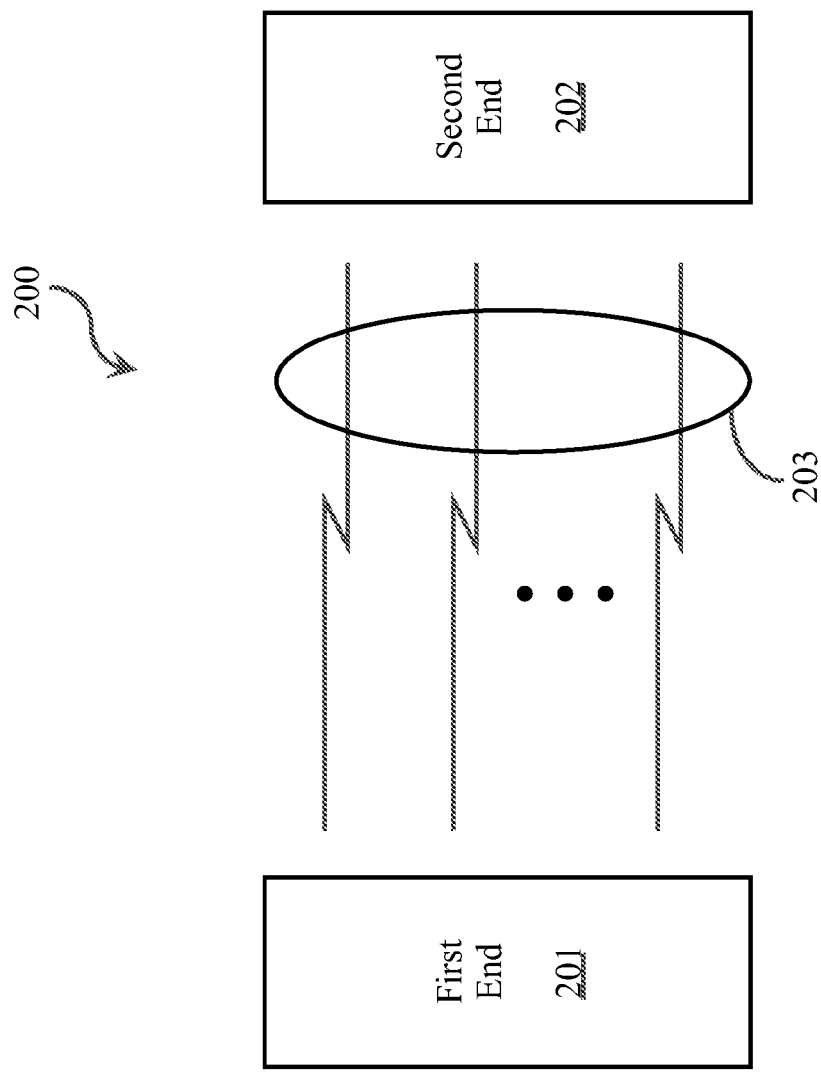
FIG. 2 illustrates a block diagram of two end computing systems communicating with each other in accordance with embodiments of the present disclosure.

FIG. 2 illustrates a non-limiting example of two such end systems communicating with each other over a plurality of communications links in accordance with embodiments of the present disclosure. Each of the two end systems may be implemented as any well-known computing systems, such as described herein with respect to FIG. 3.

The method of the present invention uses the seamless transparent connectivity module within the IP layer at both sides of the connection.

In the preferred embodiment of the present invention, said default IP address is the IP address used to establish the connection between two end systems wherein such default IP address is associated with the default link chosen by the application or the operating system.

In the preferred embodiment of the present invention, both sides of the connection typically have a plurality of active links including the default link.

In the preferred embodiment of the present invention, said seamless transparent connectivity module performs load balancing among several links.

In the preferred embodiment of the present invention, said load balancing is application sensitive, wherein such load balancing is provided to the applications based on said application Quality of Service needs and on the characteristics of the available links.

In the preferred embodiment of the present invention, Quality of Service should be taken into consideration, wherein said Quality of Service affects the network traffic and the application performance.

The method of the present invention is used when a plurality of links are available to establish a connection to the internet, wherein the seamless transport connectivity modules utilizes these links at the network layer with no regard to their specific data-link technologies.

Said load balancing mechanism is used when the application requires a large bandwidth such as video streaming or transferring large blocks of data, and when two or more links are available and none of the links has sufficient bandwidth to handle it, wherein each link offers a portion of the required bandwidth but together fulfilling it.

In the case when the bandwidth of one link is sufficient for the application's needs, load balancing is not needed. To find the best suited link for that application, said seamless transparent connectivity employs a voting algorithm where the seamless transparent connectivity module looks up the Quality of Service characteristics (such as the bandwidth, level of congestion, and usage cost criteria) the application needs to perform correctly along with a weighing factor for each of these characteristics. This weight represents the importance of a certain Quality of Service characteristic to an application. These characteristics are compared to the corresponding Quality of Service characteristics of each available link on the local machine if a link's characteristics satisfy the application's need; it gets up-voted by the weight of this characteristic. The link with the highest votes is selected to transmit the application's data.

In the case when load balancing is needed, said seamless transparent connectivity employs said voting algorithm to find the best suited set of links for an application to load balance upon where the seamless connectivity module looks up the Quality of Service characteristics (such as the bandwidth, level of congestion, and usage cost criteria) the application needs to perform correctly along with a weighing factor for each of these characteristics. This weight represents the importance of a certain Quality of Service characteristic to an application. These characteristics are compared to the corresponding Quality of Service characteristics of each available link on the local machine if a link's characteristics satisfy the application's need; it gets up-voted by the weight of this characteristic. The links that will be used for load balancing are the links with the highest votes and their accumulative bandwidth satisfies the application needs.

When load balancing is needed said packets are transmitted on different links using a load balancing mechanism such as the Weighted Round Robin algorithm, wherein such transmission allows a high and fair utilization of the different links based in their bandwidths as well as other possible factors such as the link usage cost criteria and the current level of congestion.

The method of the invention can be applied to all types of connections; regardless of the application/transport connection model whether it is client/server, peer-to-peer or any other.

The method of the present invention requires a one-time communication between the seamless transparent connectivity modules at both sides of the connection to exchange the IP addresses that are associated with the default IP address.

The invention will be further described and illustrated for the preferred embodiment of this invention, which is a method for seamless multi-link network connectivity, in the following example.

EXAMPLES

The following example illustrates the present invention without however, limiting the same thereto.

In the preferred embodiment of the present invention a test system was implemented to test and prove the concept of the seamless transparent connectivity module. The test system consists of two laptops, each laptop comprises two links; the first link is a wired Ethernet with two raw data rates, a low rate of 10 Mbps and high rate of 100 Mbps, the second link is a Wi-Fi wireless local area network 802.11g with 54 Mbps raw data rate. Said laptops were connected via local area network and all experiments were based on transferring a 72 MB files from one laptop to the other. As a base line of comparison, the throughput of each link was tested alone without the module (e.g.; When using Wi-Fi only, the throughput was around 10 Mbps). After activating the seamless transparent connectivity module, the test was repeated for both the Wi-Fi with low rate Ethernet and the Wi-Fi with high rate Ethernet, and for each combination different load balancing ratios were used, that is the ratio of the number of packets transmitted via each link (e.g.; a load balancing ratio of 20:2 means that 20 consecutive packets are transmitted via the 100 Mbps Ethernet link followed by 2 consecutive packets transmitted via the Wi-Fi link, and so on). As a result of the experiment, the load balancing between the links achieved a high percentage of the combined link bandwidths as shown in table 1. Moreover, the module achieves decent performance when the load balancing ratio is around the actual throughput ratio, whereas the performance improvement decreases as the throughput difference between the combined links get closer.

TABLE 1

Results of the testing experiments to prove the concept of the seamless transparent connectivity module

| | Ethernet Link | | | |
|---|---|---|---|---|
| | 10 Mbps | 100 Mbps | 10 Mbps | 100 Mbps |
| | | | Wi-Fi Link | |
| | 54 Mbps | | 54 Mbps | 54 Mbps |
| LB Ratio | | | 1:1  2:1 | 15:1  20:2 |
| Throughput | 9.19 | 8.97 | 63.14  15.65  16.62 | 60.68  67.03 |
| trials of | 9.90 | 9.08 | 63.63  16.33  16.89 | 65.89  67.13 |
| sending a | 9.28 | 9.12 | 64.86  16.49  16.08 | 67.24  68.49 |
| 72 MB file | 10.12 | 9.12 | 64.95  15.99  16.68 | 67.21  68.53 |
| between two | 9.49 | 9.12 | 64.96  15.65  16.50 | 67.25  68.62 |
| hosts via | 10.08 | 9.12 | 64.90  16.27  16.66 | 67.22  68.54 |
| LAN and | 9.49 | 9.12 | 64.99  16.36  15.79 | 67.27  68.61 |
| WLAN in | 10.10 | 9.12 | 64.91  15.86  16.19 | 67.27  68.61 |
| Mbps | 9.28 | 9.12 | 64.94  16.17  14.16 | 67.31  68.66 |
| | 10.10 | 9.12 | 64.81  16.22 | 67.23  68.59 |
| Mean | 9.70 | 9.11 | 64.61  16.10  16.18 | 66.46  68.28 |
| STD | 0.39 | 0.05 | 0.66  0.30  0.83 | 2.07  0.63 |
| STD/Mean | 4% | 1% | 1%  2%  5% | 3%  1% |

TABLE 1-continued

Results of the testing experiments to prove the concept of the seamless transparent connectivity module

| | Ethernet Link | | | |
|---|---|---|---|---|
| | 10 Mbps | 100 Mbps | 10 Mbps | 100 Mbps |
| | | | Wi-Fi Link | |
| | 54 Mbps | | 54 Mbps | 54 Mbps |
| Ideal Throughput (Mbps) | | | 18.81 | 74.31 |
| Utilization of ideal throughput | | | 86%  86% | 89%  92% |
| % Improvement on Ethernet | | | 77%  78% | 3%  6% |
| Ideal % Improvement possible | | | 107% | 15% |
| % Improvement/Ideal | | | 72%  73% | 19%  38% |

In the preferred embodiment of the present invention, while the present invention has been described with reference to a specific embodiment thereof, it is apparent that additions, omissions and modifications can be made by a one skilled in the art without departing from the scope and spirit thereof.

Figure 3:
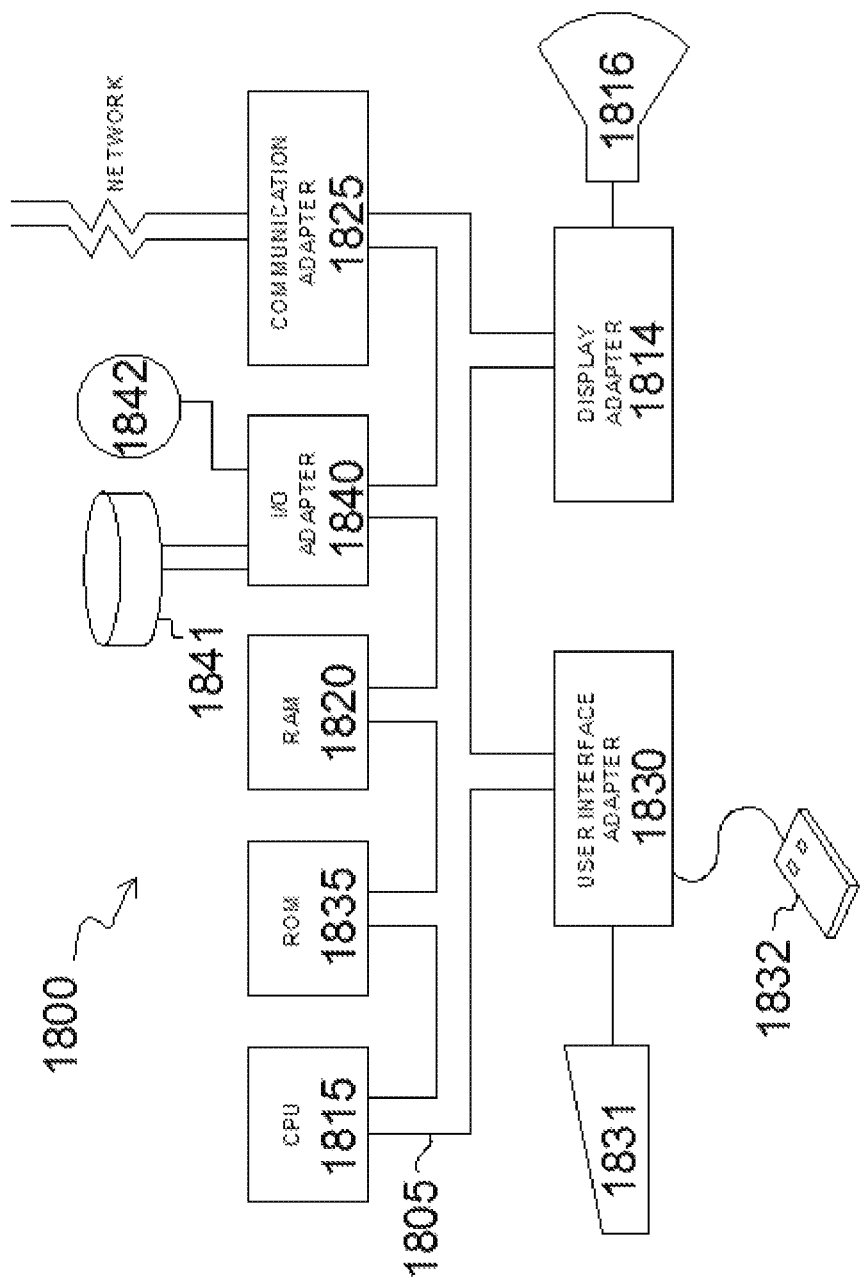
FIG. 3 illustrates a block diagram of a data processing system configured in accordance with embodiments of the present disclosure.

FIG. 3 illustrates an example of a computing system 1800 for implementing various aspects of the present disclosure such as the seamless transparent connectivity module and/or the processes disclosed with respect to FIGS. 1A and 1B. The computing system 1800 may also be used to implement either or both of the ends systems 201, 202 of FIG. 2. A processor ("CPU") 1815, volatile memory ("RAM") 1820, and non-volatile memory ("ROM") 1835 may be coupled to a local bus 1805 in any well-known manner. One or more communications adapter(s) 1825 may be coupled to the local bus 1805 to provide one or more communication channel(s) between the computer system 1800 and one or more networks (e.g., the plurality of active links described herein). A user interface adapter 1830 may provide a connection to any one of various well-known user interface devices, such as a keyboard 1831 and a mouse 1832. An I/O adapter 1840 may provide a connection for a hard disk drive 1841, a tape drive 1842, and a CD-ROM drive (not shown), or any other well-known storage devices, such as those previously mentioned. A display adapter 1814 may be coupled to the local bus 1805 and configured to operate a display device 1816.

Aspects of the present disclosure (including, but not limited to, the seamless transparent connectivity modules described herein) may be a system, a method, and/or a computer program product at any possible technical detail level of integration. Accordingly, aspects of the present disclosure may take the form of an entirely hardware embodiment, an entirely software embodiment (including firmware, resident software, micro-code, etc.), or embodiments combining software and hardware. Aspects of the present disclosure have been described herein with reference to flowchart and/or block diagrams according to embodiments of the present disclosure. It will be understood that some blocks of the block diagrams, and combinations of blocks in the block diagrams, can be implemented by computer readable program instructions. These computer readable program instructions may be provided to a processor (e.g., the CPU 1815) of a general purpose computer, special purpose computer, or other programmable data processing apparatus to produce a machine (e.g., the system 1800), such that the instructions, which execute via the processor of the computer or other programmable data processing apparatus, create circuitry or means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The invention claimed is:

1. A method for seamless multi-link connectivity, using a seamless transparent connectivity module to establish a connection between two end systems, a first end system and a second end system, the method comprising the steps of:
   initiating data-transmission from the first end system to the second end system via a default link using a default Internet Protocol ("IP") address;
   exchanging between the first end system and the second end system, within a plurality of packets, a plurality of active IP addresses associated with the default IP address by seamless transparent connectivity modules located at the first end system and the second end system;
   capturing sent packets exchanged between the two end system before leaving and IP layer of a first end system Internet stack;
   checking whether a plurality of packets that have been captured need load balancing;
   if load balancing is needed, then a set of active links is chosen to load balance on;
   if load balancing is not needed, then a best fitting active link is chosen;
   changing a source IP address to one of the IP addresses of said selected active links after conducting the load balancing check;
   changing a destination IP address to one of the IP addresses associated with the default IP address of the second end system;
   transmitting said packets on different link using a load-balancing mechanism or using said best fitting active link if load balancing is not needed;
   capturing, at the second end system, packets being received as they enter an IP layer of a Transmission Control Protocol ("TCP/IP") stack of the second end system;
   changing the source IP addresses and the destination IP addresses of the received packets with the default IP addresses of said first and second end systems by the seamless transparent connectivity modules of the first end system and the second end system; and
   forwarding the packets up the TCP/IP stack of the second end system.

2. The method of claim 1, Wherein said method uses the seamless transparent connectivity modules within the IP layers of the first and second end systems.

3. The method of claim 2, wherein said seamless transparent connectivity modules perform load balancing among the plurality of active links.

4. The method of claim 3, wherein said load balancing is provided to a plurality of applications based on application Quality of Service needs and on characteristics of the plurality of active links.

5. The method of claim 3, wherein said load balancing is used when an application being run at the first or second end system requires a large bandwidth, and when each of the plurality of active links offers a portion of the required bandwidth but together fulfilling it.

6. The method of claim 5, wherein said seamless transparent connectivity modules employ a voting algorithm to find a best suited set of links from the plurality of active links for an application where the seamless connectivity module looks up a set of Quality of Service characteristics the application needs to perform correctly along with a weighing factor for each of these characteristics.

7. The method of claim 6, wherein said packets are transmitted on some or all of the plurality of active links using a load balancing mechanism, such transmission allows a high and fair utilization of the plurality of active links based on their bandwidths.

8. The method of claim 7, wherein said load balancing is not conducted when the bandwidth of one of the plurality of active links is sufficient for the application's need.

9. The method of claim 1, wherein the first and second end systems typically have a plurality of active links including the default link.

10. The method of claim 1, wherein the seamless transport connectivity modules of the first end system and the second end system utilize the plurality of active links available at the first end system and second end system with no regard to their specific data-link technologies.

11. A method for seamless multi-link connectivity between a first end system and a second end system, the method comprising:
   initiating data transmission from the first end system to the second end system via a default link using a default Internet Protocol ("IP") address;
   exchanging between the first end system and the second end system, within a plurality of packets, a plurality of active IP addresses associated with the default IP address;
   capturing the exchanged packets before leaving an IP layer of an Internet stack of the first end system;
   checking whether a plurality of packets that have been captured need load balancing;
   if load balancing is needed, then a set of active links is chosen to load balance on;
   if load balancing is not needed, then a best fitting active link is chosen;
   changing a source IP address to one of the IP addresses of said selected active links after conducting the load balancing check;
   changing a destination IP address to one of the IP addresses associated with the default IP address of the second end system;
   transmitting said packets on different links using a load-balancing mechanism or using said best fitting active link if load balancing is not needed;
   capturing, at the second end system, packets being received as they enter an IP layer of a Transmission Control Protocol ("TCP/IP") stack of the second end system;
   changing the source IP addresses and the destination IP addresses of the received packets with the default IP addresses of said first and second end systems; and
   forwarding the packets up the TCP/IP stack of the second end system.

12. The method of claim 11, wherein the first and second end systems typically have a plurality of active links including the default link.

13. The method of claim 12, wherein the first and second end systems perform load balancing among the plurality of active links.

14. The method of claim 13, wherein said load balancing is provided to one or more applications based on application Quality of Service needs and on characteristics of the plurality of active links.

15. The method of claim 13, wherein said load balancing is used when an application being run at the first or second end system requires a large bandwidth, and when each of the plurality of active links offers a portion of the required bandwidth but together fulfilling it.

16. The method of claim 13, wherein said packets are transmitted on some or all of the plurality of active links using the load-balancing mechanism, such transmission allows a high and fair utilization of the plurality of active links based on their bandwidths.

17. The method of claim 15, wherein a voting algorithm is employed to find a best suited set of links from the plurality of active links for an application where the seamless connectivity module looks up a set of Quality of Service characteristics the application needs to perform correctly along with a weighing factor for each of these characteristics.

18. The method of claim 15, wherein said load balancing is not conducted when the bandwidth of one of the plurality of active links is sufficient for the application's need.

19. The method of claim 14, wherein said Quality of Service affects network traffic over one or more of the active links and a performance of one of the applications.

20. The method of claim 11, wherein the first end system and the second end system utilize a plurality of active links available at the network layer with no regard to their specific data-link technologies.

* * * * *